United States Patent [19]

Wunderlich et al.

[11] 4,336,229

[45] Jun. 22, 1982

[54] APPARATUS FOR THE PRODUCTION OF AMMONIA SYNTHESIS GAS FROM PURIFIED COKE OVEN GAS

[75] Inventors: Egmar Wunderlich, Mülheim; Joachim Meckel, Heiligenhaus; Dietrich Wagener; Stefan Smieskol, both of Essen, all of Fed. Rep. of Germany

[73] Assignee: Didier Engineering GmbH, Fed. Rep. of Germany

[21] Appl. No.: 199,566

[22] Filed: Oct. 22, 1980

[30] Foreign Application Priority Data

Nov. 29, 1979 [DE] Fed. Rep. of Germany ....... 2948107

[51] Int. Cl.$^3$ .......................... C01C 1/04; B01J 8/04; B01J 8/06
[52] U.S. Cl. ................................... 422/148; 422/190; 422/193; 422/195; 422/204; 422/221; 422/312
[58] Field of Search .............. 422/148, 190, 193, 195, 422/202, 203, 208, 221, 171, 179, 205, 312

[56] References Cited

U.S. PATENT DOCUMENTS

| | | | |
|---|---|---|---|
| 1,826,548 | 10/1931 | Jaeger | 422/202 |
| 2,013,652 | 9/1935 | Hall | 422/90 |
| 3,450,507 | 6/1969 | Korwin | 422/221 |
| 3,544,264 | 12/1970 | Hardison | 422/190 X |
| 3,607,125 | 9/1971 | Kydd | 422/221 X |

FOREIGN PATENT DOCUMENTS 2705324 8/1978 Fed. Rep. of Germany ...... 422/190

Primary Examiner—Michael S. Marcus
Attorney, Agent, or Firm—Wood, Herron & Evans

[57] ABSTRACT

Apparatus for the production of ammonia synthesis gas by the catalytic cracking of coke oven gas in the presence of water vapor and air is disclosed. The apparatus includes concentric inner and outer pipes, a first annular reaction zone between the pipes and a second reaction zone inside the inner pipe, both zones containing a catalyst. The purified coke oven gas along with air and water vapor is introduced into the interior of the outer pipe, i.e., into the first reaction zone at one end. The gas flows along the length of the pipes and then into the inner pipe, i.e., the second reaction zone, through a number of openings in the end of the inner pipe opposite the end of the outer pipe where the coke oven gas was initially introduced. The gas then flows along the length of the inner pipe to the opposite end where the cracked gas is removed.

5 Claims, 2 Drawing Figures

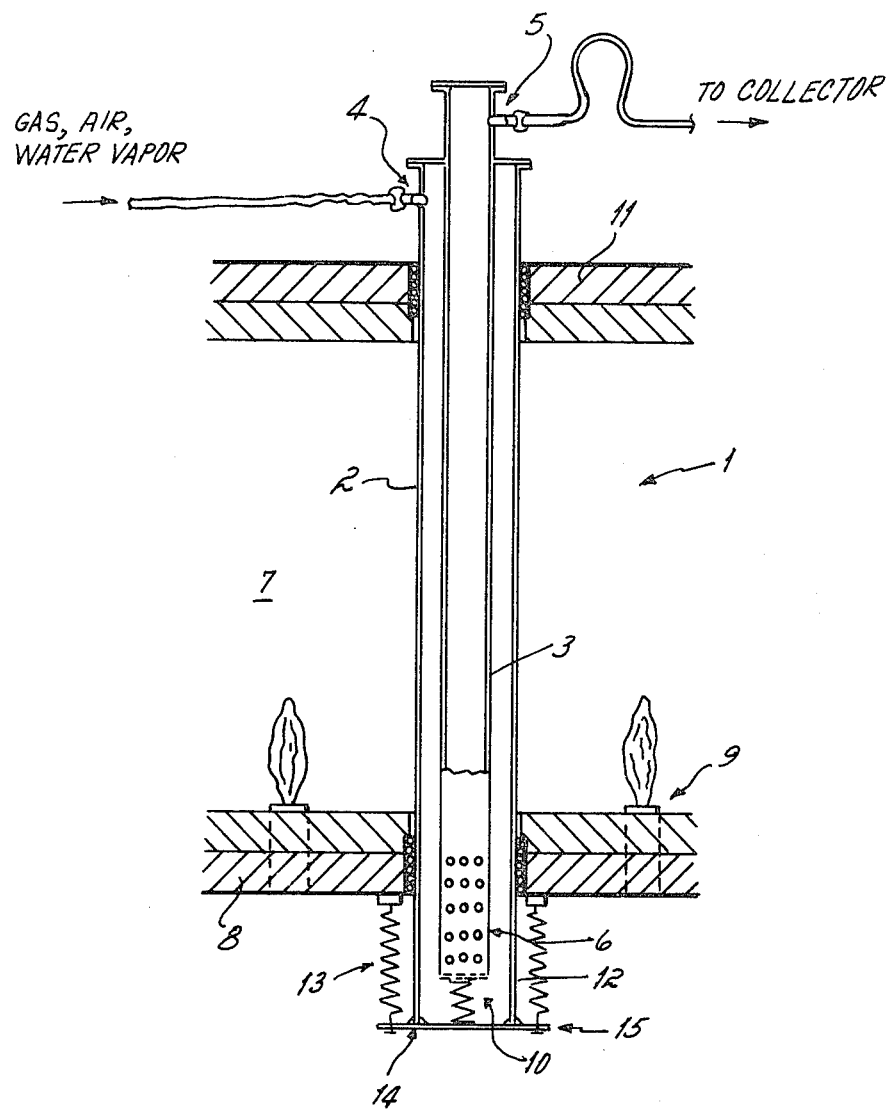

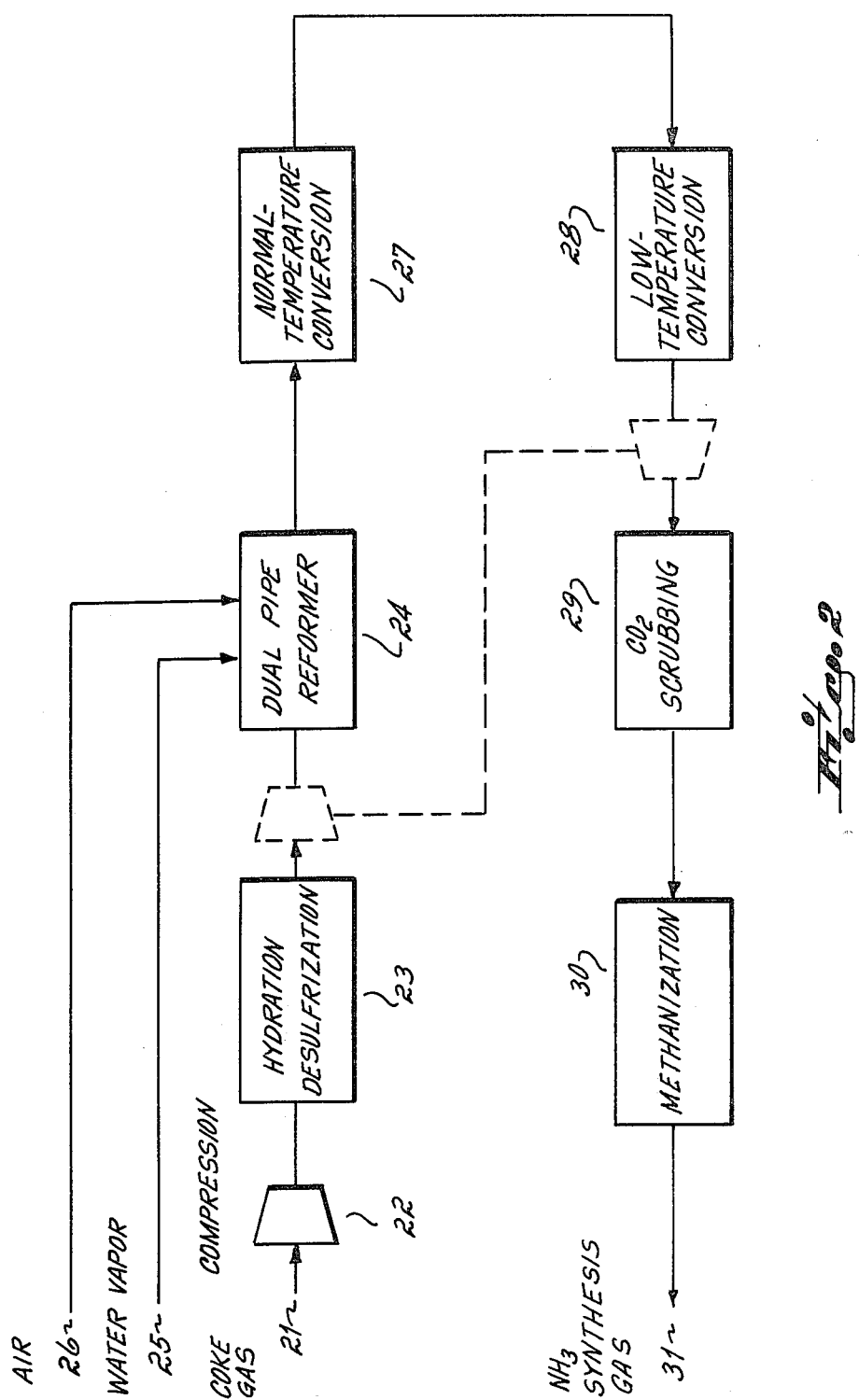

4,336,229

APPARATUS FOR THE PRODUCTION OF AMMONIA SYNTHESIS GAS FROM PURIFIED COKE OVEN GAS

BACKGROUND OF THE INVENTION

This invention relates to an apparatus for the catalytic cracking of purified coke oven gas to produce ammonia synthesis gas.

It is known in the prior art to subject coke oven gas to catalytic autothermic cracking with water vapor and oxygen-enriched air. However, since oxygen is needed, the process is expensive. It is also known in the prior art to crack coke oven gas with water vapor and air in two separate reactors, a primary reactor and a secondary reactor. However, this process is also expensive in that it requires expensive cycles and high investments.

BRIEF DESCRIPTION OF THE INVENTION

Accordingly, it is among the principal objects of this invention to provide an apparatus for the production of ammonia synthesis gas from coke oven gas which overcomes the disadvantages of the prior art referred to above and enables the economic generation of ammonia synthesis gas from coke oven gas.

To this end, the present invention provides an apparatus for the production of ammonia synthesis gas by the catalytic cracking of coke oven gas in the presence of water vapor and air. In a presently preferred embodiment of the invention, the reactor consists of two pipes, one mounted concentrically inside the other. The reactor has an opening at the upper end of the outer pipe through which gas, air and water vapor is introduced into the annular reaction zone formed by the inner and outer pipes. This gas mixture flows along the length of the pipes and then through a series of holes at the bottom of the inner pipe into the interior of the inner pipe which defines a second reaction zone. A suitable catalyst is placed in each zone. The gas then flows upwardly through the inner pipe and out the upper end. The space in the apparatus between the inner and outer pipes corresponds in principle with an autothermic reactor. In this space, the oxygen reaction is predominant whereby the temperature rises by about 450° C. due to partial oxidation. The inside pipe provides the final equilibrium adjustment to the ammonia synthesis gas. An air separating facility is not required for the operation of the apparatus of the present invention thus lowering the investment and operating costs. Maintenance and, consequently, the overall cost of operation of the apparatus is also low. The present invention thus provides a dual pipe reactor which is only a single reactor which is compact in design and has reduced floor space requirements.

In a further embodiment of the invention, a highly active catalyst is placed in the annular space between the inner and outer pipes, i.e., the first reaction zone, and a less active catalyst is placed in the inside pipe, i.e., the second reaction zone. Suitable catalysts for that purpose are nickel catalysts on an $Al_2O_3$ base with a nickel content between 5 and 40%. The subject invention thus provides for optimal adjustment of the catalysts to the temperatures and reaction prevailing in the apparatus within broad reaction ranges.

Other objects and advantages of the present invention will be apparent from the following detailed description taken with the accompanying drawings.

BRIEF DESCRIPTION OF THE DRAWINGS

FIG. 1 is a cross-sectional view of the apparatus of the present invention.

FIG. 2 is a flow diagram of a process for the operation of the present invention.

DETAILED DESCRIPTION OF THE INVENTION

According to the embodiment shown in FIG. 1, a dual pipe reactor 1 includes an outside pipe 2 and an inside pipe 3 with a ratio of the cross-sectional areas of the inside pipe 3 to the annular space between the two pipes within the range of 0.1 to 1.5. The inside pipe 3 extends at its upper end out of the outside pipe 3 and terminates at the bottom end a certain distance from the lower end of the outer pipe 2. The dual pipe reactor 1 is held in a reactor furnace 7, with the outer pipe 2 being inserted in fixed fashion in the upper area in a reactor furnace wall 11 while at the lower end, it passes through a bottom 8 of the reactor 7 with an outer end 12 extending out of the reactor bottom 8. Inserted in the bottom 8 of the reactor furnace 7, interchangeably, are burners 9 which supply the necessary heat to the endothermic process taking place in the dual pipe reactor 1.

The reaction mixture consisting essentially of coke gas, air and water vapor, is introduced by means of a line into the dual pipe reactor 1, through an intake opening 4 into the upper end of the outside pipe 2 extending out of the reactor wall 11. From there, the reaction gas mixture flows through the space between outside pipe 2 and inside pipe 3 from the top to the bottom, in which space the necessary, highly active reaction catalyst is provided. The inside pipe 3 features at the lower end a flow connection with the outside pipe 2 in the form of suitable openings in the wall of the inside pipe 3. Through this flow connection 6, the gas enters the inside pipe 3 which is charged as well with a catalyst which, however, may be less active than that in the outside pipe 2. The gas flows in the inside tube 3 from the bottom up to the outlet opening 5 which is located in the part of the inside pipe 3 that extends upward out of the outside pipe 2. The gas is then routed to a collector via a line.

To accommodate varying degrees of thermal expansion, the inside pipe 3 is elasticly mounted to a support 10 on the inside face of the lower end wall 14 of the outside pipe 2. The end wall 14 has a web 15 which extends beyond the circumference of the outside pipe 2. With the aid of a spring suspension 13 attached between the underside of the bottom 8 of the furnace 7 and the web 15, the outer pipe 2, and thus the dual pipe reactor 1, is elastically hung from the bottom 8, thereby permitting relative thermal expansion of the pipes 2 and 3.

Referring now to FIG. 2, purified coke gas 21 is compressed in unit 22 to approximately 35 bars and proceeds to a hydrating reactor 23 where the organic sulfur compounds are hydrated on a catalyst substrate. These sulfur compounds are washed out in a $H_2S$ scrubber with a solution. Following the scrubbing step is a ZnO stage for fine desulurization of the gas stream. The desulfurized gas is expanded to approximately 16 bars and is mixed with water vapor 25 and air 26 as it is introduced into the upper part of the outside pipe 2. The desulfurized coke oven gas with water vapor and air is heated to approximately 500° C. The reaction mixture flows through the highly active $Ni-Al_2O_3$ catalyst charge in the outside pipe 2 and is then passed through the openings 6 in the bottom part of the inside pipe 3 over another, less active Ni-Al$_2$O$_3$ catalyst layer. The cracked gas is routed above the upper reactor furnace wall to a collector at a temperature of about 940° C. The cracked gas leaving the reactor furnace is characterized by a ratio $$\frac{CO + H_2}{N_2} = 3.05 - 3.1;$$

the residual CH$_4$ content is in the range <0.4% by volume tr.

After utilization of the sensible heat, the cracked gas out of the dual pipe reactor 1 is subjected to a normal temperature conversion 27 and a low temperature conversion 28. Next, the gas is compressed to about 25 bars. In the case of cracking at lower pressures, i.e., pressures in the range about 1 to 40 bars, the energy reclaimed in the expansion of the charge gas can be utilized for the compression of the cracked gas after the CO conversion stages 27 and 28. Compressed to about 25 bars, the gas proceeds then to a CO$_2$ scrubbing and a subsequent methanization stage 30 where the NH$_3$ synthesis gas is then withdrawn.

At a reaction pressure of 2 bars and a NH$_3$ output of approximately 100 tons daily the cross-section of the cracking furnace is about 4.5 m to 7 m with 40 pipes and a heating length of about 7.6 m as well as a ratio of inside pipe cross section to annular gap cross-section of 0.3.

We claim:

1. Apparatus for the production of ammonia synthesis gas by the catalytic cracking of coke oven gas in the presence of water vapor and air comprising means defining a furnace having opposing walls, a first pipe extending through said furnace walls with the ends thereof situated exterior to said walls and furnace, coke oven gas, water vapor and air, the other end thereof being closed, a second pipe mounted inside said first pipe and having a first end and a second end opposite said one end of said first outer pipe, said second end being perforate about its periphery so that said second pipe is in gas flow communication with said first outer pipe at said second end, said first outer pipe and said second pipe defining a first reaction zone therebetween and said second pipe defining a second reaction zone interiorly thereof, each said reaction zone containing a different catalyst, and means communicating with the interior of said second pipe at said first end for removing the cracked gas from the apparatus, said second pipe having one of said ends rigidly connected to said first outer pipe and the other of said ends elastically connected to said first outer pipe, and said first outer pipe having one end elastically connected to one of said furnace walls.

2. The apparatus of claim 1 wherein said first and second pipes are mounted generally vertically and wherein a mixture of coke oven gas, water vapor and air is introduced into the apparatus at the upper end of the outside pipe, the means communicating with the interior of the second pipe for removing the cracked gas is located at the upper end of said second pipe, and the gas flow communication between the two pipes is located at the lower end of said pipes.

3. The apparatus of claim 1 wherein said first and second pipes are disposed generally vertically, the upper end of said first pipe is fixedly mounted to one of said furnace walls, and its lower end passes through said opposed furnace wall and is elastically supported thereto.

4. The apparatus of claim 1 wherein the heated length of the first and second pipe ranges from about 6 to 10 meters and wherein the ratio of the cross-sectional area of the second pipe to the annular gap between the second pipe and first pipe is in the range of about 0.2 to 1.5.

5. The apparatus of claim 1 wherein said first outer pipe contains a catalyst comprising from about 5 to 40% nickel on an alumina substrate and wherein the inside pipe contains a relatively less active catalyst.

* * * * *

UNITED STATES PATENT AND TRADEMARK OFFICE
CERTIFICATE OF CORRECTION

PATENT NO. : 4,336,229
DATED : June 22, 1982
INVENTOR(S) : Egmar Wunderlich et al It is certified that error appears in the above—identified patent and that said Letters Patent is hereby corrected as shown below:

Column 1, line 64, "reaction" should be --reactions--.

Column 2, line 61, "desulurization" should be --desulfurization--.

Signed and Sealed this

Seventeenth Day of August 1982

[SEAL]

Attest:

Attesting Officer

GERALD J. MOSSINGHOFF

Commissioner of Patents and Trademarks